(12) United States Patent
Muthuswamy

(10) Patent No.: US 10,796,265 B2
(45) Date of Patent: Oct. 6, 2020

(54) METHOD AND SYSTEM FOR EVALUATING PERFORMANCE OF ONE OR MORE EMPLOYEES OF AN ORGANIZATION

(71) Applicant: WIPRO LIMITED, Bangalore (IN)

(72) Inventor: Sridharan Muthuswamy, San Jose, CA (US)

(73) Assignee: Wipro Limited, Bangalore (IN)

( * ) Notice: Subject to any disclaimer, the term of this patent is extended or adjusted under 35 U.S.C. 154(b) by 236 days.

(21) Appl. No.: 15/718,311

(22) Filed: Sep. 28, 2017

(65) Prior Publication Data

US 2019/0095843 A1     Mar. 28, 2019

(51) Int. Cl.
*G06Q 10/06*     (2012.01)
*G06F 40/30*     (2020.01)

(52) U.S. Cl.
CPC ....... *G06Q 10/06398* (2013.01); *G06F 40/30* (2020.01)

(58) Field of Classification Search
CPC .......................... G06Q 10/06398; G06F 40/30
See application file for complete search history.

(56) References Cited

U.S. PATENT DOCUMENTS

| | | | | |
|---|---|---|---|---|
| 5,819,231 A | * | 10/1998 | Tremaine | G06Q 10/06375 705/7.21 |
| 8,856,725 B1 | * | 10/2014 | Anderson | G06F 8/75 717/103 |
| 9,305,277 B2 | * | 4/2016 | Herbert | G06Q 10/06311 |
| 9,645,817 B1 | * | 5/2017 | van Schaik | G06F 8/77 |
| 2004/0060051 A1 | * | 3/2004 | Bradshaw | G06Q 10/06398 718/106 |
| 2004/0088177 A1 | * | 5/2004 | Travis | G06Q 10/06398 705/7.42 |
| 2008/0228549 A1 | * | 9/2008 | Harrison | G06Q 10/06 705/7.14 |
| 2010/0114672 A1 | * | 5/2010 | Klaus | G06Q 10/00 705/7.14 |
| 2012/0035987 A1 | * | 2/2012 | Anand | G06Q 10/06398 705/7.42 |

(Continued)

*Primary Examiner* — Sujay Koneru
(74) *Attorney, Agent, or Firm* — Finnegan, Henderson, Farabow, Garrett & Dunner, LLP

(57) ABSTRACT

Disclosed subject matter relates to data analytics including a method of evaluating performance of employees of an organization. A performance evaluating system provides a review matrix corresponding to one of plurality of review contexts to recommenders for receiving their feedback including recommender's review score and review comments in the review matrix for the employees. Further, the performance evaluating system generates a system review score for each employee by analysing the review comments and computes a compound review score for each employee and each of the plurality of review contexts using the recommender's review score and the system review score. Furthermore, cumulative evaluation score for each employee is computed using the compound review score, predefined organizational weights and historical evaluation score. Finally, the cumulative evaluation score of is analysed to evaluate performance of the employees and reward them objectively. The method enables unbiased and holistic evaluation of employees in the organization.

16 Claims, 6 Drawing Sheets

(56) References Cited

U.S. PATENT DOCUMENTS

| | | | |
|---|---|---|---|
| 2014/0278638 A1* | 9/2014 | Kreuzkamp | G06Q 10/06398 705/7.15 |
| 2015/0142520 A1* | 5/2015 | Bala | G06Q 30/0203 705/7.32 |
| 2015/0269244 A1* | 9/2015 | Qamar | G06Q 10/06398 705/7.42 |
| 2016/0098490 A1* | 4/2016 | Pola | G06F 16/955 709/204 |
| 2016/0104184 A1* | 4/2016 | Yacobi | G06Q 30/0214 705/7.42 |
| 2016/0110789 A1* | 4/2016 | Gilb | G06Q 30/0282 705/26.44 |
| 2016/0196511 A1* | 7/2016 | Anisingaraju | G06Q 10/063 705/7.11 |
| 2016/0300499 A1* | 10/2016 | Heasman | G09B 5/10 |
| 2016/0342921 A1* | 11/2016 | Morin | G06Q 10/06393 |
| 2016/0371625 A1* | 12/2016 | Mosley | G06Q 10/06398 |
| 2017/0124575 A1* | 5/2017 | Clark | G06F 16/24578 |
| 2017/0178207 A1* | 6/2017 | Steinberg | G06Q 30/0282 |
| 2017/0193397 A1* | 7/2017 | Kottha | G06F 17/2785 |
| 2017/0293874 A1* | 10/2017 | Asaf | G06Q 10/0637 |
| 2017/0372249 A1* | 12/2017 | Abraham | G06Q 10/06393 |
| 2018/0005161 A1* | 1/2018 | Cong | G06Q 10/06393 |
| 2019/0066011 A1* | 2/2019 | Portnoy | G06Q 10/0637 |

* cited by examiner

METHOD AND SYSTEM FOR EVALUATING PERFORMANCE OF ONE OR MORE EMPLOYEES OF AN ORGANIZATION

TECHNICAL FIELD

The present subject matter relates generally to data analytics, and more particularly, but not exclusively to a method and a system for evaluating performance of one or more employees of an organization.

BACKGROUND

Generally, process of evaluating employees based on their performance is a common scenario in every organization. Evaluating employees based on their performance is crucial for identifying excellent performers among group of the employees in the organization, based on which employees are provided with increments, rewards, promotion and the like. However, in many organizations, evaluation of the performance may be biased. Further, complete set of parameters that define role of the employee in the organization may not be considered, thereby leading to a partial evaluation of the performance. As an example, consider the employee to be a developer in a software organization. Main role of the developer in the software organization may be to develop or design a system. However, designing a system may not be the only parameter to evaluate the performance of the developer. The developer may have additional roles such as working with quality analysis team, product management team, attending client meetings, interviewing candidates, providing trainings and the like. Therefore, these roles of the developer may not be considered for evaluating performance of the developer in the software organization.

Existing techniques for evaluating the developer in the software organization include considering code centric parameters such as checking number of lines of code written by the developer and code commit history of the developer. However, evaluating based on only the number of lines of code and the code commit history may not be correct because many a times, developers spend enormous amount of time trying to debug programs as well. Therefore, the number of lines of code generated during the debug time may be nil. This may lead to a negative evaluation of the developer, though the developer is a good performer. Few other existing techniques include evaluating the developer by comparing the performance of the developer with a benchmark performance of a high productivity developer. However, selecting the high productivity developer may be biased and not rigorous. Also, the high productivity developer may not constantly be a good performer and cannot be considered as an appropriate developer for comparison purposes. Further, when the high productivity developer leaves the organization, the benchmark is re-established with a new high productivity developer which is a tedious process. Few other techniques include code review methods in which the developer is evaluated based on the reviews and comments obtained for the code written by the developer. However, the reviews and comments may be biased and sometimes high level comments such as "Great, Proceed", may not indicate essence and holistic contribution of the developer's work.

Therefore, the existing techniques include incomplete and inappropriate evaluation of the employees in the organization.

SUMMARY

One or more shortcomings of the prior art may be overcome and additional advantages may be provided through the present disclosure. Additional features and advantages may be realized through the techniques of the present disclosure. Other embodiments and aspects of the disclosure are described in detail herein and are considered a part of the claimed disclosure.

Disclosed herein is a method of evaluating performance of one or more employees of an organization. The method includes providing, by a performance evaluating system, a review matrix corresponding to one of plurality of review contexts assigned to one or more recommenders on corresponding end user devices. Further, the performance evaluating system receives a feedback in the review matrix for each of the one or more employees from the one or more recommenders. The feedback comprises a recommender's review score and review comments. Upon receiving the feedback, the performance evaluating system, generates a system review score for each of the one or more employees by analysing the review comments. Further, the performance evaluating system computes a compound review score for each of the one or more employees for each of the plurality of review contexts using the recommender's review score and the system review score. Furthermore, the performance evaluating system, computes a cumulative evaluation score for each of the one or more employees using the compound review score generated for each of the plurality of review contexts, predefined organizational weights and historical evaluation score of each of the one or more employees. Finally, the performance evaluating system, analyses the cumulative evaluation score of each of the one or more employees to evaluate performance of each of the one or more employees.

Further, the present disclosure includes a performance evaluating system for evaluating performance of one or more employees of an organization. The performance evaluating system includes a processor and a memory communicatively coupled to the processor. The memory may store the processor-executable instructions, which, on execution, causes the processor to provide a review matrix corresponding to one of plurality of review contexts assigned to one or more recommenders on corresponding end user device. Further, the processor receives a feedback in the review matrix for each of the one or more employees from the one or more recommenders. The feedback comprises a recommender's review score and review comments. The processor generates a system review score for each of the one or more employees based on the review comments, upon receiving the feedback. Further, the processor computes a compound review score for each of the one or more employees for each of the plurality of review contexts using the recommender's review score and the system review score. Furthermore, the processor computes a cumulative evaluation score for each of the one or more employees using the compound review score generated for each of the plurality of review contexts, predefined organizational weights and historical evaluation score of each of the one or more employees. Finally, the processor analyses the cumulative evaluation score of each of the one or more employees to evaluate performance of each of the one or more employees.

Furthermore, the present disclosure includes a non-transitory computer readable medium including instructions stored thereon that when processed by at least one processor causes an performance evaluating system to perform operations comprising providing a review matrix corresponding to one of plurality of review contexts assigned to one or more recommenders on corresponding end user devices. Upon providing the review matrix, the instructions cause the processor to receiving a feedback in the review matrix for each of the one or more employees from the one or more recommenders. The feedback comprises a recommender's review score and review comments. Further, the instructions cause the processor to generate a system review score for each of the one or more employees by analysing the review comments. Furthermore, the instructions cause the processor to compute a compound review score for each of the one or more employees for each of the plurality of review contexts using the recommender's review score and the system review score. Upon computing the compound review score, the instructions cause the processor to compute a cumulative evaluation score for each of the one or more employees using the compound review score generated for each of the plurality of review contexts, predefined organizational weights and historical evaluation score of each of the one or more employees. Finally, the instructions cause the processor to analyse the cumulative evaluation score of each of the one or more employees to evaluate performance of each of the one or more employees.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DIAGRAMS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which:

Figure 1A:
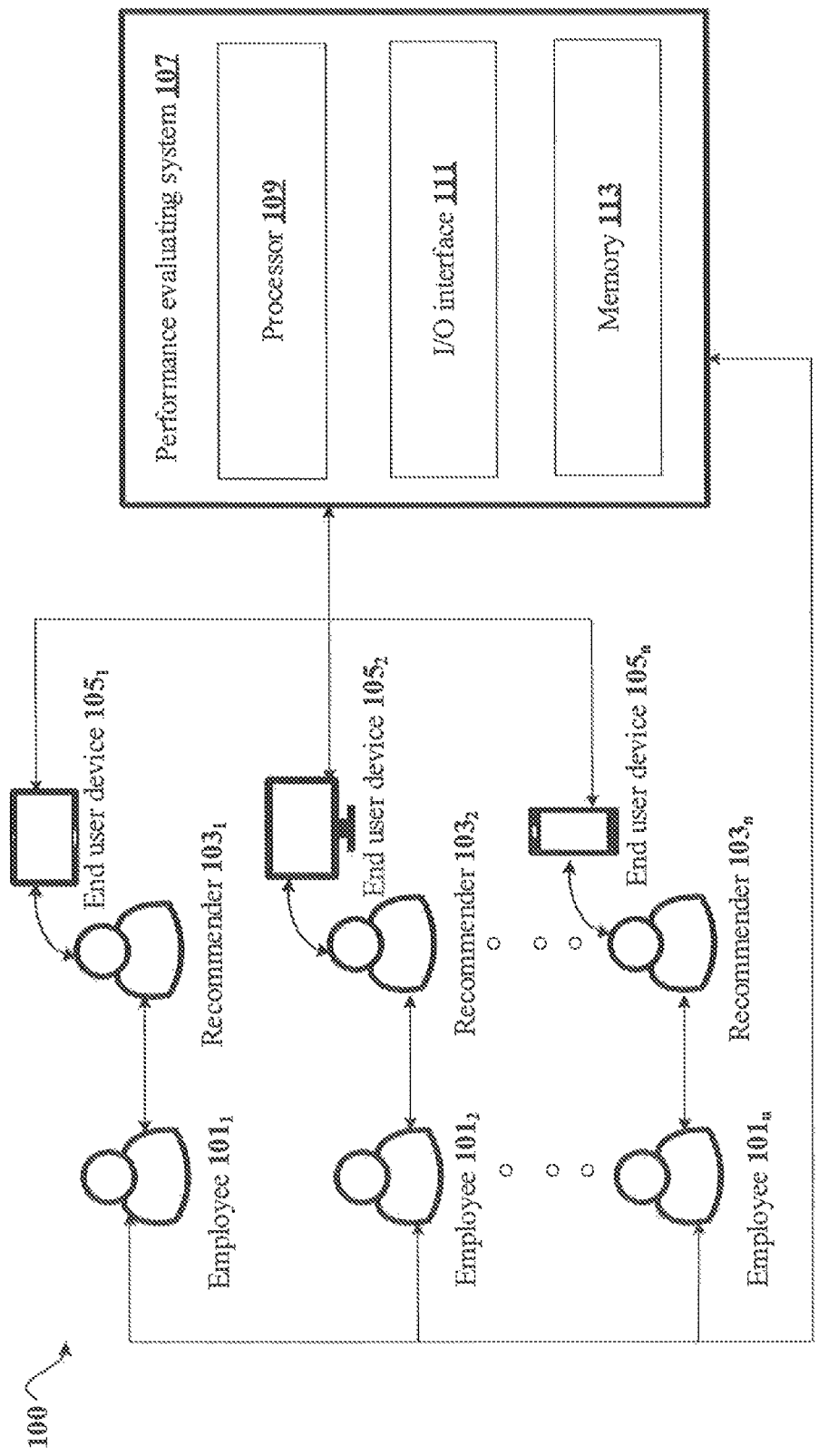
FIG. 1A shows an exemplary architecture for evaluating performance of one or more employees of an organization in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the forms disclosed, but on the contrary, the disclosure is to cover all modifications, equivalents, and alternative falling within the scope of the disclosure.

The terms "comprises", "comprising", "includes" or any other variations thereof, are intended to cover a non-exclusive inclusion, such that a setup, device or method that includes a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

Disclosed herein are a method and a system for evaluating performance of one or more employees of an organization using a performance evaluating system. The performance evaluating system may be a server. Although, in the present disclosure, the method for evaluating performance of the one or more employees is described in conjunction with the server, the method can also be implemented in various computing systems/devices, other than the server. The one or more employees in the organization may communicate with the performance evaluating system through an application or a website provided by the performance evaluating system. The one or more employees may create a task in the application to obtain feedback from one or more recommenders and select the one or more recommenders with whom a task link corresponding to the created task would be shared by the performance evaluating system. Further, the one or more employees may select a review context among plurality of the review contexts provided in the task. The plurality of review contexts indicate different functionalities that an employee is entitled to perform in the organization. Based on the review context selected by the one or more employees, the performance evaluating system may provide a review matrix corresponding to the review context on end user devices of the one or more recommenders.

The review matrix is a template that includes review parameters associated with one of the plurality of review contexts, corresponding scoring boxes for individual scores related to the review parameters and a text box for review comments by one or more recommenders. Further, the performance evaluating system may receive a feedback in the review matrix for each of the one or more employees from the one or more recommenders. The feedback comprises a recommender's review score and review comments. In some embodiments, the one or more recommenders may in turn receive a feedback from the one or more employees. The feature where the employee and the recommender provide feedback for each other, ensures that both the parties effectively communicate and close on the feedback process in a timely manner. Upon receiving the feedback, the performance evaluating system may generate a system review score for each of the one or more employees by analysing the review comments using Natural Language Processing (NLP) technique. Further, the performance evaluating system may compute a compound review score for each of the one or more employees for each of the plurality of review contexts using the recommender's review score and the system review score. Therefore, the performance evaluation of the employee does not completely depend on the review score provided by the recommender. Based on the error between the recommender's review score and the system review score, certain weightage is assigned to both the scores that helps in computing the final cumulative evaluation score of the employee. Furthermore, the performance evaluating system, computes a cumulative evaluation score for each of the one or more employees using the compound review score generated for each of the plurality of review contexts, predefined organizational weights and historical evaluation score of each of the one or more employees. Inclusion of the historical evaluation scores ensures that the performance of the employee in the past projects is also given certain weightage while evaluating the performance of the employee in the current project. Further, the performance evaluating system, analyses the cumulative evaluation score of each of the one or more employees to evaluate performance of each of the one or more employees. Upon analysing the cumulative evaluation scores of each of the one or more employees, the performance evaluating system may rank each of the one or more employees based on their respective cumulative evaluation score. Further, the one or more employees depicting equivalent performance may be clustered based on the respective cumulative evaluation score. Finally, the performance evaluating system, may automatically compute appraisal rewards to be allotted to each of the one or more employees present in each cluster based on a predefined criteria. The present disclosure provides a feature wherein employees of an organization are evaluated holistically based on all the functionalities that the employee of a certain role can perform. Also, the present disclosure is an unbiased system for evaluating the employees of the organization.

A description of an embodiment with several components in communication with each other does not imply that all such components are required. On the contrary a variety of optional components are described to illustrate the wide variety of possible embodiments of the invention.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1A shows an exemplary architecture for evaluating performance of one or more employees of an organization in accordance with some embodiments of the present disclosure.

The architecture 100 includes an employee 1 $101_1$ to employee n $101_n$ (collectively referred as one or more employees 101), a recommender 1 $103_1$ to recommender $103_n$ (collectively referred as one or more recommenders 103), end user device $105_1$ to end user device 105. (collectively referred as end user devices 105) and a performance evaluating system 107. For ease of understanding, the present disclosure is described further with respect to a software organization and considering that the one or more employees 101 and the one or more recommenders 103 are associated with the software organization. However, the disclosure is applicable to any organization and not limited to only the software organizations. As an example, the one or more employees 101 may be developers in the software organization. As an example, the one or more recommenders 103 may be developers, clients, Quality Analysis (QA) engineers, interviewed candidates and the like who are related to the software organization.

Figure 1B:
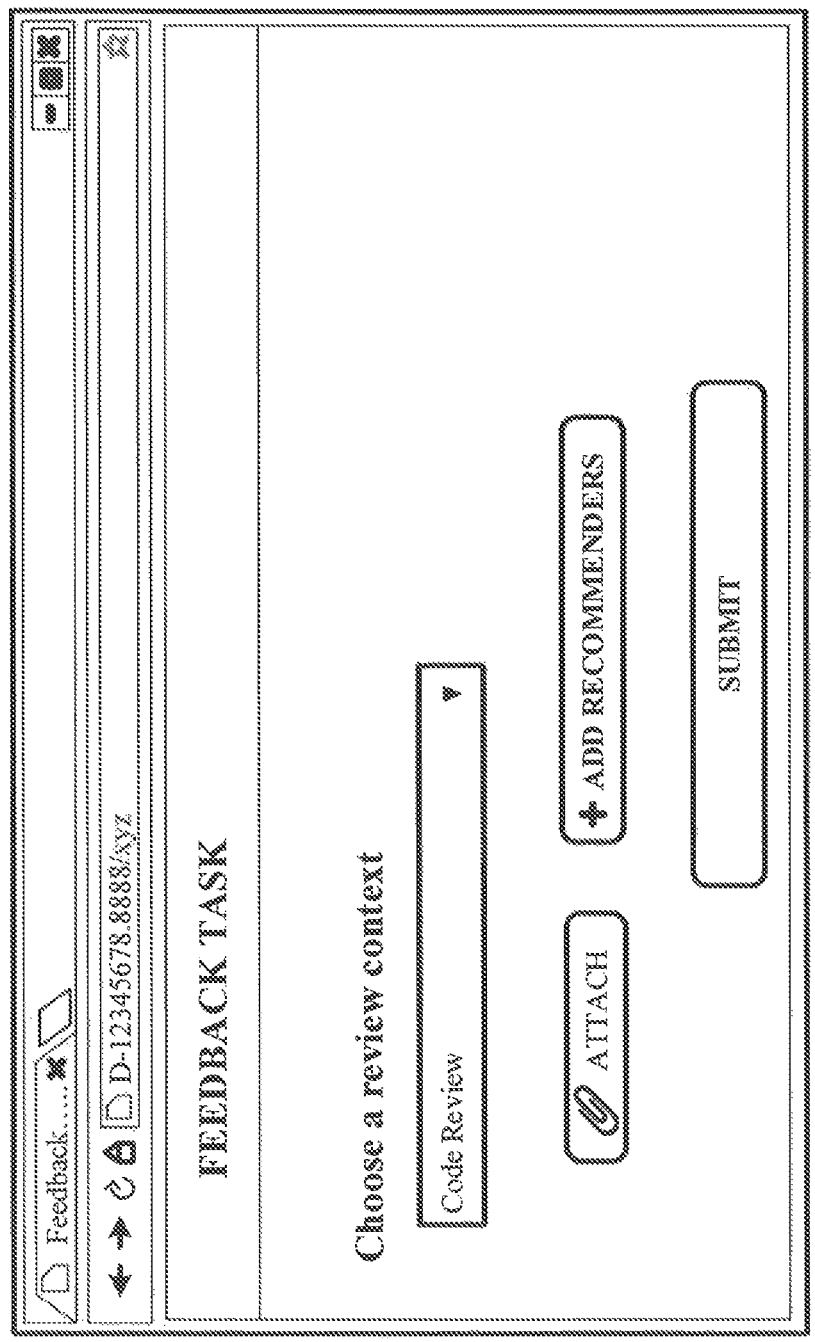
FIG. 1B shows an exemplary representation of a task in accordance with some embodiments of the present disclosure.
Figure 1C:
FIG. 1C shows an exemplary representation of a review matrix in accordance with some embodiments of the present disclosure.

In an embodiment, the one or more recommenders 103 may be any person who is intended to provide feedback to the one or more employees 101. Each of the one or more employees 101 and the one or more recommenders 103 may interact with the performance evaluation system 107 via at least one of an application or a website. Each of the one or more employees 101 would login into the application or the website for creating a task that helps in obtaining feedback from the one or more recommenders 103. In an embodiment, the task may act as an interactive window displayed on the end user devices 105 which includes, but not limited to, a title such as a "Feedback Task" as shown in FIG. 1B, a description box containing text such as "Choose a review context" as shown in the FIG. 1B, a drop-down menu to choose a review context as shown under the heading "Choose a review context" in the FIG. 1B, "Add Recommenders" box for adding contact details of one or more recommenders 103 such as an email address, facility to attach or link supporting documents and a submit button that is used to submit the above mentioned details selected by each of the one or more employees 101 and create the task. An exemplary representation of the task is shown in the FIG. 1B. In an embodiment, the supporting documents may include, but not limited to, code commit Identifier (IDs) from source code repository, bug IDs from defects database, support case IDs from Technical Assisting Centre (TAC) ticketing database and web-links to any other information relevant to the review context. Each created task may be identified by a unique ID. Further, the performance evaluating system 107 may generate a task link for each created task and share the task link with the one or more recommenders 103 who is intended to provide the feedback to each of the one or more employees 101 via a communication network (not shown in the FIG. 1). The communication network may be at least one of a wired communication network or a wireless communication network. Each of the one or more recommenders 103 who received the task link may communicate with the performance evaluating system 107 through the application or the website by opening the task link received from each of the one or more employees 101. In an embodiment, each of the one or more recommenders 103 may open the task link on corresponding end user devices 105. As an example, the end user devices 105 may be a mobile, a laptop, a tablet, a desktop and the like.

The performance evaluating system 107 includes a processor 109, an Input/Output (I/O) interface 111 and a memory 113. The processor 109 may fetch the task corresponding to the task link when the one or more recommenders 103 click on the task link. In some embodiments, the task may be stored in the memory 113. In some embodiments, the task may be stored in an external repository associated with the performance evaluating system 107. Upon fetching the task, the processor 109 may provide the task to the corresponding end user devices 105 for display. The one or more recommenders 103 may view the task on the corresponding end user devices 105 and select one of a plurality of review contexts present in the task. The plurality of review contexts indicates different functionalities that an employee is entitled to perform in the organization. As an example, the plurality of review contexts for developers in the software organization may include, but not limited to, code review, QA review, support review, coding skill diversity review, hiring assist review, training/knowledge transfer review and innovation center review. The processor 109 may receive the one of the plurality of review contexts selected by the one or more recommenders 103. Based on the one of the plurality of review context received from the one or more recommenders 103, the processor 109 may provide a review matrix corresponding to the one of the plurality of the review contexts to the one or more recommenders 103. The review matrix is a template that includes review parameters associated with the plurality of review contexts, corresponding scoring boxes for individual scores related to the review parameters and a text box for review comments. An exemplary representation of the review matrix is shown in the FIG. 1C. In some embodiments, the text box may be a common text box for all review parameters in the review matrix. In some embodiments, each of the review parameters may be associated with a corresponding text box to receive comments. Further, the processor 109 may receive the feedback in the review matrix for each of the one or more employees 101 from the one or more recommenders 103. In some embodiments, the feedback includes a recommender's review score and the review comments of the one or more recommenders 103. In some embodiments, the recommender's review score may be obtained by averaging individual scores provided for each review parameter in the review matrix by each of the one or more recommenders 103. In some embodiments, the review comments may be provided in English language. Upon receiving the feedback, the processor 109 may use a Natural Language Processing technique to analyse the review comments received from the one or more recommenders 103. Based on the analysis, the processor 109 may generate a system review score for each of the one or more employees 101.

Further, the processor 109 may compute a Square Error (SE) value between the recommender's review score and the system review score corresponding to the review context for each of the one or more recommenders 103. The processor 109 may compare the SE value obtained with a predefined SE threshold to identify a first weightage value corresponding to the recommender's review score and a second weightage value corresponding to the system review score. In some embodiments, the first weightage value and the second weightage value are relative to one another based on the SE value, indicating weightage of the recommender's review score and the system review score respectively for further steps. Thereafter, the processor 109 may correlate the recommender's review score with the first weightage value and the system review score with the second weightage value to generate a compound review score for each of the one or more employees 101 corresponding to the selected review context. Similarly, the processor 109 may obtain the compound review score for each of the one or more employees 101 for each of the plurality of review contexts. Further, the processor 109 may correlate the compound review score of each of the plurality of review contexts with corresponding predefined organizational weights to generate a current evaluation score for each of the one or more employees 101.

In some embodiments, the predefined organizational weights indicate weightage of each of the plurality of review contexts set by the organization based on the role of each of the one or more employees 101 in the organization. Further, the processor 109 may correlate the current evaluation score of each of the one or more employees 101 with their respective historical evaluation scores to generate the cumulative evaluation score of each of the one or more employees 101. In some embodiments, the historical evaluation scores may be evaluation scores obtained by each of the one or more employees 101 in previous performance evaluation sessions. Upon obtaining the cumulative evaluation score of each of the one or more employees 101, the processor 109 may analyse the cumulative evaluation score of each of the one or more employees 101 to evaluate performance of each of the one or more employees 101. Further, the processor 109 may rank each of the one or more employees 101 based on their respective cumulative evaluation score. Based on the ranking and the analysis, the processor 109 may cluster the one or more employees 101 depicting equivalent performance. In some embodiments, performance of the one or more employees 101 may be considered as equivalent when the cumulative evaluation score of the one or more employees 101 may be within a predefined range. Upon clustering the cumulative scores of one or more employees 101, the processor 109 may automatically compute appraisal rewards to be allotted to each of the one or more employees 101 present in each cluster based on predefined criteria.

Figure 2:
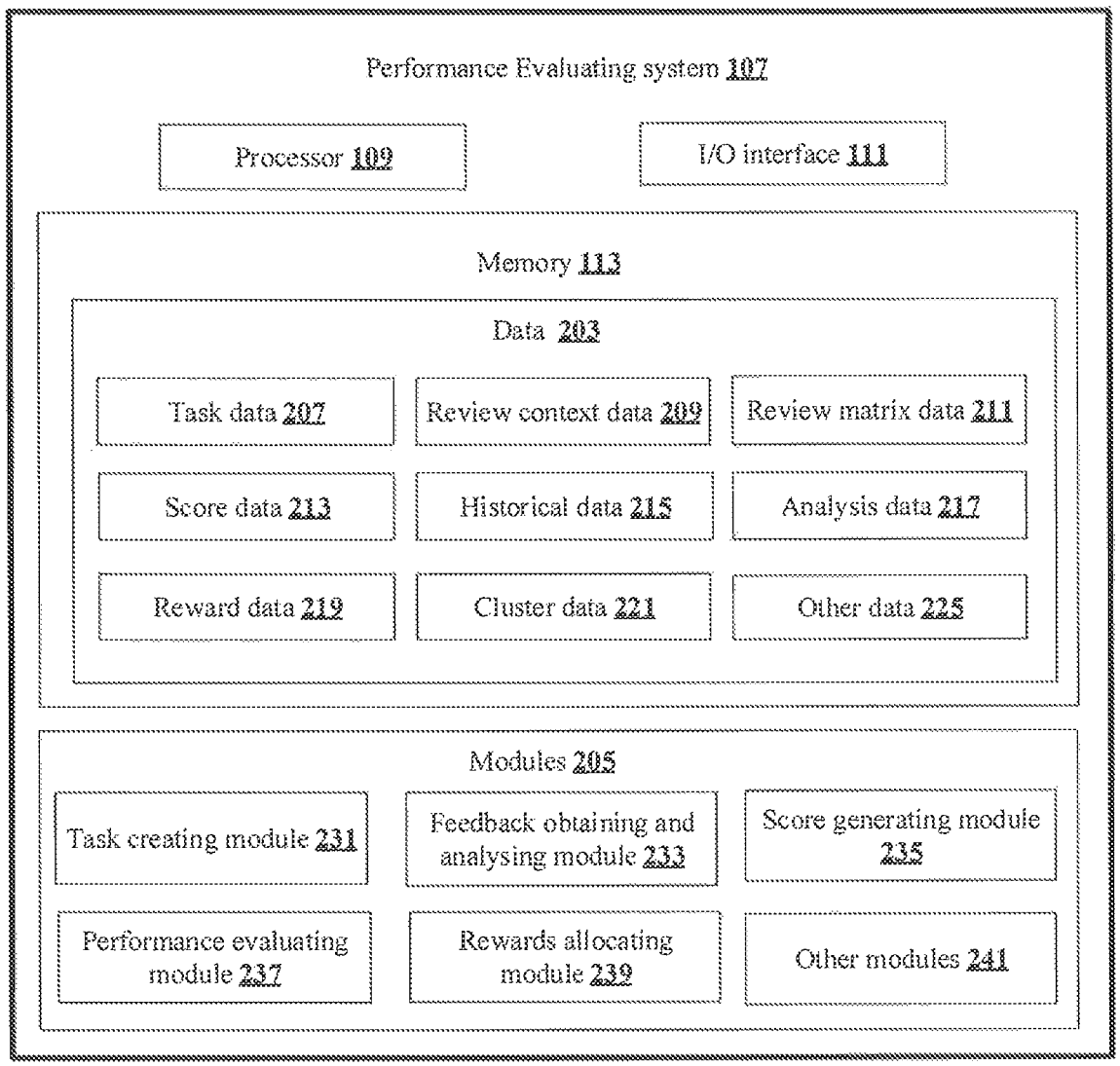
FIG. 2 shows a detailed block diagram of a performance evaluating system for evaluating performance of one or more employees of an organization in accordance with some embodiments of the present disclosure.

FIG. 2 shows a detailed block diagram of a performance evaluating system for evaluating performance of one or more employees of an organization in accordance with some embodiments of the present disclosure.

In some implementations, the performance evaluating system 107 may include data 203 and modules 205. As an example, the data 203 is stored in the memory 113 configured in the performance evaluating system 107 as shown in the FIG. 2. In one embodiment, the data 203 may include task data 207, review context data 209, review matrix data 211, score data 213, historical data 215, analysis data 217, reward data 219, cluster data 221 and other data 225. In the illustrated FIG. 2, modules 205 are described herein in detail.

In some embodiments, the data 203 may be stored in the memory 113 in form of various data structures. Additionally, the data 203 can be organized using data models, such as relational or hierarchical data models. The other data 225 may store data, including temporary data and temporary files, generated by the modules 205 for performing the various functions of the performance evaluating system 107.

In some embodiments, the data 203 stored in the memory 113 may be processed by the modules 205 of the performance evaluating system 107. The modules 205 may be stored within the memory 113. In an example, the modules 205 communicatively coupled to the processor 109 configured in the performance evaluating system 107, may also be present outside the memory 113 as shown in FIG. 2 and implemented as hardware. As used herein, the term modules refer to an application specific integrated circuit (ASIC), an electronic circuit, a processor (shared, dedicated, or group) and memory that execute one or more software or firmware programs, a combinational logic circuit, and/or other suitable components that provide the described functionality.

In an embodiment, the modules 205 may include, for example, a task creating module 231, a feedback obtaining and analysing module 233, a score generating module 235, a performance evaluating module 237, rewards allocating module 239 and other modules 243. The other modules 243 may be used to perform various miscellaneous functionalities of the performance evaluating system 107. It will be appreciated that such aforementioned modules 205 may be represented as a single module or a combination of different modules.

In some embodiments, the task creating module 231 may create a task for each of the one or more employees 101. The task is a medium/user interface that helps in obtaining feedback from one or more recommenders 103. The task creating module 231 may receive inputs related to contents of the task from each of the one or more employees 101. As an example, each of the one or more employees 101 may select the review contexts to be present in the task based on their role in the organization. Upon providing the inputs, each of the one or more employees 101 may click on the submit button based on which the task creating module 231 may create the task for each of the one or more employees 101. Each created task may be identified by a unique ID. In some embodiments, the task may include, but not limited to, a title such as "Feedback Task" as shown in the FIG. 1B, a description box containing text such as "Choose a review context" as shown in the FIG. 1B, a drop-down menu to choose a review context as shown below the heading "Choose a review context" in the FIG. 1B, an "Add Recommenders" box for adding contact details of one or more recommenders 103 such as an email address, facility to attach or link supporting documents and a submit button that is used submit the abovementioned details selected by each of the one or more employees 101 and create the task. In some embodiments, the supporting documents may include, but not limited to, code commit Identifier (IDs) from source code repository, bug IDs from defects database, support case IDs from Technical Assistance Centre (TAC) ticketing database and web-links to any other information relevant to the review context. The created tasks along with the corresponding unique ID may be stored as the task data 207. Further, the task creating module 231 may receive a list of the one or more recommenders 103 who is intended to provide the feedback to each of the one or more employees 101, from each of the one or more employees 101. The task creating module 231 may further share a task link to the list of the one or more recommenders 103.

In some embodiments, the feedback obtaining and analysing module 233 may obtain feedback from the one or more recommenders 103. The feedback obtaining and analyzing module 233 may receive one of plurality of review contexts selected by the one or more employees 101. The plurality of review contexts indicate different functionalities that an employee is entitled to perform in the organization. Each of the plurality of review contexts may be stored as review context data 209. As an example, the plurality of review contexts for developers in the software organization may include, but not limited to, code review, Quality Analysis (QA) review, support review, coding skill diversity review, hiring assist review, training/knowledge transfer review and innovation center review.

Code review: In some embodiments, the code review may include a formal review process where the recommender 103 may review the software code submitted by the developer. The developer may also provide review for the recommender 103 who reviews the submitted code. Therefore, both developer and recommender 103 may be involved in effective communication to close the review in a timely manner.

QA review: In some embodiments, the developers in the software organization spend substantial amount of time with QA engineers in a Software Development Life Cycle (SDLC). QA review may facilitate review of developers by the QA engineers and vice versa to identify how effectively and efficiently the developers and the QA engineers work with each other and build cross-department reputation.

Support Review: In some embodiments, the developers in the software organization work with product management and technical marketing for translating high-level requirements into software architecture and design documents. Also, the developers participate in pitching solutions to customer or being a technical resource in client meetings. Further, the developers engage in fixing customer escalations. Support review may facilitate review of the developers based on the effectiveness of the developers in the support functionalities.

Coding Skill Diversity Review: In some embodiments, the developers in the software organization may fix issues in other areas such as application developer fixing issues in the operating system kernel or device driver, Java developer fixing issues in C++ code and the like. Coding skill diversity review facilitates review of the developers by identifying extra capabilities, which helps in project management, task assignment and project efficiency.

Hiring assist review: In some embodiments, the developers in the software organization may interview candidates and participate in team building. Most of the times they are unprepared for the interview and candidates asked questions unrelated to the job. Hiring assist review may facilitate review of the developers from the candidates attending the interview based on preparation and quality of technical interview conducted for the candidates.

Training/Knowledge transfer review: In some embodiments, the developers in the software organization may train new hires or share knowledge on familiar codes and the like. Training/Knowledge transfer review may facilitate review of the developers from the people trained based on quality of information shared and training skills of the developer.

Innovation center review: In some embodiments, the developers in the software organization indulge in publishing papers, filing patents for novel ideas, participating in hackathons and the like. Innovation center review facilitates review of the developers based on technical extra-curricular activities performed by the developer.

Based on the, one of the plurality of review contexts received from the one or more employees 101, the feedback obtaining and analysing module 233 may provide a review matrix corresponding to the one of the plurality of the review contexts to the one or more recommenders 103. The review matrix is a template that includes review parameters associated with one of the plurality of review contexts, corresponding scoring boxes for individual scores related to the review parameters and a text box for review comments by one or more recommenders 103. The review matrices and the corresponding review parameters are stored as review matrix data 211.

As an example, the review parameters present in the review matrix corresponding to the plurality of the review contexts are mentioned below:
  Review parameters for the review context "Code review":
  Recommender 103 providing review to developer:
  Logic in code solving the particular problem in hand;
  Intelligence in narrowing down/fixing the issue (for bugs);
  Depth and breadth of the code changes—code coverage;
  Modularity/reusability;
  Security robustness;
  Readability (code structure);
  Code comments;

Criticality of the check-in;

Business (customer) impact;

Code robustness—null pointer checks, boundary conditions;

Unit test cases—complete set and their execution status;

Performance bottleneck;

Troubleshooting instrumentation built in for debugging;

Code redundancy; and

Resourcefulness of the developer—reusing code available.

Developer providing review to recommender 103:

Usefulness in improving code quality;

Timeliness for the project;

Relevance to the check-in;

Technical competence in the assessment;

Thoroughness in assessing various code artifacts;

Professionalism;

Communication skills; and

Flexibility and ease to work with.

Review parameters for the review context "QA review":

Recommender 103 providing review to developer:

Technical expertise in understanding software features;

Thoroughness in quality assurance/testing and test plan coverage;

Creativity in logging and reproducing bugs;

Scripting skill—test automation;

Professionalism; and

Ease to work with.

Developer providing review to recommender 103:

Quality of the code produced;

Technical knowledge and ability to explain code artifacts to testers;

Thoroughness and usefulness of feature design documents;

Creativity in troubleshooting through instrumented code;

Ideas in building test setups to effectively test features;

Professionalism; and

Ease to work with.

Review parameters for the review context "Support review":

Recommender 103 providing review to developer:

Business acumen bridging requirements into software architecture;

Sense of urgency in customer escalations;

Technical expertise in customer pitching and sales meetings; and

Creativity in helping reproduce customer issues and addressing them.

Review parameters for the review context "Coding Skill Diversity review":

Recommender 103 providing review to developer:

Technicality of the contribution per code review standards above; and

Special rating for a novice contributor in remote code.

Review parameters for the review context "Coding Skill Diversity review":

Recommender 103 providing review to developer:

Preparedness for the interview;

Relevance of questions;

Uniqueness of questions (or copied from the internet);

Professionalism; and

Overall experience (and special note if any).

Review parameters for the review context "Hiring Assist review":

Recommender 103 providing review to developer:

Preparedness for the interview;

Relevance of questions;

Uniqueness of questions (or copied from the internet);

Professionalism; and

Overall experience (and special note if any).

Review parameters for the review context "Training/Knowledge Transfer review":

Recommender 103 providing review to developer:

Communication skills;

Openness to sharing and discussing (without withholding information);

Technical expertise in the subject matter; and

Usefulness of training/knowledge transfer session.

Review parameters for the review context "Innovation centre review":

Recommender providing review to developer:

Patents filed;

Paper publications;

Hackathons;

Technical Blogs; and

White Papers.

Further, the feedback obtaining and analysing module 233 may receive the feedback in the review matrix for each of the one or more employees 101 from the one or more recommenders 103. In some embodiments, the feedback includes a recommender's review score and the review comments of the one or more recommenders 103. In some embodiments, the recommender's review score may be obtained by averaging individual scores provided for each review parameter in the review matrix by each of the one or more recommenders 103. In some embodiments, the review comments may be provided in English language. In some embodiments, the one or more employees 101 may also provide feedback to the recommender 103. Further, the feedback of the one or more employees 101 and the one or more recommenders 103 is anonymous since the feedback would be indicated only in terms of employee IDs and group IDs.

In some embodiments, the score generating module 235 may generate a system review score based on the analysis of the review comments of the one or more recommenders 103. The system review score indicates review score deserved by each of the one or more employees 101 which is derived from the review comments. The system review score is stored as the score data 213.

In some embodiments, the score generating module 235 may generate a compound review score for each of the one or more employees 101. The compound review score of each of the one or more employees 101 is stored as the score data 213. Initially, the score generating module 235 may compute a Square Error (SE) value between the recommender's review score and the system review score corresponding to the review context for each of the one or more recommenders 103. Further, the score generating module 235 may compare the SE value obtained with a predefined SE threshold to identify a first weightage value corresponding to the recommender's review score and a second weightage value corresponding to the system review score. The predefined SE threshold values are as shown in the below exemplary Table 1.

TABLE 1

| SE threshold (%) | First weightage value (w1) | Second weightage value (w2) |
|---|---|---|
| <10 | 0.5 | 0.5 |
| 10-20 | 0.6 | 0.4 |
| 20-30 | 0.7 | 0.3 |

TABLE 1-continued

| SE threshold (%) | First weightage value (w1) | Second weightage value (w2) |
|---|---|---|
| 30-40 | 0.8 | 0.2 |
| 40-50 | 0.9 | 0.1 |
| >50 | 1.0 | 0 |

In some embodiments, the first weightage value and the second weightage value are relative to one another based on the SE value, indicating weightage of the recommender's review score and the system review score respectively for further steps. Thereafter, the processor 109 may correlate the recommender's review score with the first weightage value and the system review score with the second weightage value to generate a compound review score for each of the one or more employees 101 corresponding to the selected review context. In some embodiments, the compound review score may be computed using the below mentioned equation (Equation 1).

$$CoRS = RS*w1 + SS*w2 \qquad \text{Equation 1}$$

In the above Equation 1,
CoRS indicates Compound Review Score;
RS indicates the Recommenders's review score;
w1 indicates the first weightage value;
SS indicates the System review score; and
w2 indicates the second weightage value.

Similarly, the processor 109 may obtain the compound review score for each of the one or more employees 101 for each of the plurality of review contexts using the above Equation 1.

In some embodiment, the score generating module 235 may correlate the compound review score of each of the plurality of review contexts with corresponding predefined organizational weights to generate a current evaluation score for each of the one or more employees 101. The current evaluation score of each of the one or more employees 101 is stored as the score data 213. In some embodiments, the predefined organizational weights indicate weightage of each of the plurality of review contexts set by the organization based on the role of each of the one or more employees 101 in the organization. In some embodiments, the current evaluation score may be computed using the below mentioned equation (Equation 2).

$$ES = \Sigma CoRS_i * W_i \qquad \text{Equation 2}$$

In the above Equation 2,
ES indicates the current Evaluation score;
$CoRS_i$ indicates compound review score of a particular review context;
$W_i$ indicates the predefined organizational weight of the corresponding review context;
and
iε(1, 2, 3, 4, 5, 6, 7).

Further, the processor 109 may correlate the current evaluation score of each of the one or more employees 101 with their respective historical evaluation scores to generate the cumulative evaluation score of each of the one or more employees 101. The cumulative evaluation score of each of the one or more employees 101 is stored as the score data 213. In some embodiments, the historical evaluation scores may be evaluation scores obtained by each of the one or more employees 101 using the above Equation 2 in previous performance evaluation sessions. The historical evaluation scores may be considered by the score generating module 235 for generating cumulative evaluation score with an intention of providing credit to performance of each of the one or more employees 101 in past years in different software related projects. The historical evaluation scores of each of the one or more employees 101 may be stored as the historical data 215. In some embodiments, the cumulative evaluation score may be generated using at least one of linear weighting technique or an exponential-down weighting technique. In some embodiments, the cumulative evaluation score may be computed using the linear weighting technique using the below Equation 3.

$$ESr = 1/n \Sigma ES_i \qquad \text{Equation 3}$$

In the above Equation 3,
ESr indicates the cumulative evaluation score;
n indicates the number of past software projects being considered; and
$ES_i$ indicates the current evaluation score/historical evaluation scores in past software projects, where iε{1, 2, 3, 4, ..., n}

In some embodiments, the linear weighting technique is used for computing the cumulative evaluation score when 100% of the historical evaluation scores need to be considered.

In some embodiments, the cumulative evaluation score may be computed using the exponential-down weighting technique using the below Equation 4.

$$ESr = 1/n \Sigma ES_i * e^{(-(i-1)/S)} \qquad \text{Equation 4}$$

ESr indicates the cumulative evaluation score;
n indicates the number of past software projects being considered;
$ES_i$ indicates the current evaluation score/historical evaluation scores in past software projects, where iε{1, 2, 3, 4, ..., n}; and
e indicates an exponential factor.

In some embodiments, the exponential-down weighting technique is used for computing the cumulative evaluation score when only a fraction of the historical evaluation scores need to be considered.

In some embodiments, the performance evaluating module 237 may analyse the cumulative evaluation score of each of the one or more employees 101 to evaluate performance of each of the one or more employees 101. In some embodiments, the performance evaluating module 237 may generate reports, graphs and the like to illustrate the evaluated performance of each of the one or more employees 101. The reports, graphs and the like generated based on the analysis of the cumulative evaluation score of each of the one or more employees 101 is stored as the analysis data 217. Further, the performance evaluating module 237 may rank each of the one or more employees 101 based on their respective cumulative evaluation score. In some embodiments, the ranking of the one or more employees 101 may be within a team or within a domain of the organization.

In some embodiments, the rewards allocating module 239 may allocate rewards to each of the one or more employees 101 based on the ranking and the analysis performed by the performance evaluating module 237. Information related to the allocation of rewards to each of the one or more employees 101 is stored as the reward data 219. Initially, the rewards allocating module 239 may cluster the one or more employees 101 depicting equivalent performance. In some embodiments, performance of the one or more employees 101 may be considered as equivalent when the cumulative evaluation score of the one or more employees 101 may be within a predefined range. The clusters formed by the rewards allocating module 239, that includes one or more employees 101 are stored as the cluster data 221. Further, the rewards allocating module 239 may automatically compute appraisal rewards to be allotted to each of the one or more employees 101 present in each cluster based on a predefined criteria. As an example, the predefined criteria may specify that difference between appraisal rewards of each cluster should be 5%. As an example, consider appraisal rewards may be providing bonus funds along with salary for each of the one or more employees 101. Consider that the total bonus fund allocated for appraisal rewards is "X" USD. Therefore, considering the predefined criteria, the rewards allocating module 239 may compute the allocation of the bonus funds for each cluster. As an example, if the baseline bonus fund computed for each of the one or more employees 101 in the cluster 1 is "A", then "D" may be delta in the bonus funds between each successive clusters such that the bonus funds are allocated according to the predefined criteria.

As an example, in some embodiments, the allocation of the bonus funds for each cluster may be computed using the below Equation 5.

$$X = A + (A - D) + \ldots + (A - (n-1)D) \quad \text{Equation 5}$$
$$= nA - n(n-1)D/2$$

In the above Equation 5, n indicates total number of clusters.

As an example, in some embodiments, the reward allocating module 239 may compute variable "A" using the below Equation 6.

$$A = mD \quad \text{Equation 6}$$

In the above Equation 6, m indicates an integer that satisfies the constraint m>(n−1)/2.

Based on the result obtained using the above Equation 6, the reward allocating module 239 may derive the baseline bonus fund as a function of total bonus fund using the below Equation 7.

$$A(m-(n-1)/2) = (m/n)X$$
$$A = (2m/n)X/(2m-n+1) \quad \text{Equation 7}$$

Henceforth, the process for evaluating performance of one or more employees 101 of an organization is explained with the help of one or more examples for better understanding of the present disclosure. However, the one or more examples should not be considered as limitation of the present disclosure.

Consider an exemplary scenario where 3 developers D1, D2 and D3 in the software organization are being evaluated using the method disclosed in the present disclosure. The developers D1, D2 and D3 are evaluated for the review context "Code review" by a single recommender 103 each.

Consider the recommender's review score for D1 is 76. The recommender 103 may have provided the review comments such as "Good work. Has completed the code in less time and has captured requirement of the client correctly in the code". Therefore, based on the review comments, the performance evaluating system 107 may generate a system review score for D1 as 85. The performance evaluating system 107 further computes the SE value between the recommender's review score and the system review score. As an example, consider the SE value is 0.81%, which is calculated as shown below.

$$(0.76 - 0.85)^2 * 100 = 0.81\%$$

The performance evaluating system 107 compares the SE value 0.81% with the SE threshold represented in Table 1 to determine the first weightage value and the second weightage value. In this scenario, the first weightage value and the second weightage value are 0.5 and 0.5 respectively.

Further, the performance evaluating system 107 computes the compound review score for the review context "Code review" for D1 using the Equation 1 as shown below.

$$CoRS = RS * w1 + SS * w2 \quad \text{Equation 1}$$
$$= 76 * 0.5 + 85 * 0.5 = 80.5$$

Therefore, the compound review score for the review context "Code review" for D1 is 80.5.

Similarly, the compound review score for the review context "Code review" is calculated for D2 as 90 and for D3 as 87. Similarly, the performance evaluating system 107 computes compound review score for each review context applicable for the developers. The compound review score for the developer D1, D2 and D3 for all the review contexts along with predefined organizational weights for each review context is shown in the below Table 2.

TABLE 2

| Review context | Predefined organizational weights | D1 | D2 | D3 |
|---|---|---|---|---|
| Code Review | 1.0 | 80.5 | 90 | 87 |
| QA Review | 0.9 | 90 | 89 | 60 |
| Support Review | 0.6 | 95 | 50 | 95 |
| Coding Skill Diversity Review | 0.4 | 0 | 70 | 80 |
| Hiring Assist Review | 0.7 | 75 | 85 | 0 |
| Training/Knowledge Transfer Review | 0.7 | 60 | 0 | 0 |
| Innovation Center Review | 0.3 | 87 | 0 | 90 |

In some embodiments, if the developer receives recommender's review score for each review context from many recommenders 103, the performance evaluating system 107 may compute the compound review score corresponding to the recommender's review score of each recommender 103 individually. Further, the performance evaluating system 107 may compute an average of the compound review scores corresponding to each recommender's review score computed for the particular review context.

Further, the performance evaluating system 107 computes the current evaluation score for the developer D1, D2 and D3 by correlating the compound review score obtained for each of the plurality of review contexts using the Equation 2 as shown below.

$$ES = \sum CoRS_i * W_i \quad \text{Equation 2}$$
$$= (80.5 * 1) + (90 * 0.9) + (95 * 0.6) +$$
$$(0 * 0.4) + (75 * 0.7) + (60 * 0.7) + (87 * 0.3)$$
$$= 339.1$$

Therefore, upon computing the current evaluation score for developer D1, the values obtained is 339.1. Similarly, the current evaluation score is computed for each developer and the values obtained are as shown below:

Current Evaluation Score (ES) of developer
D1=339.1

Current Evaluation Score (ES) of developer
D2=287.6

Current Evaluation Score (ES) of developer D3=257

Further, the performance evaluating system 107 computes the cumulative evaluation score using the exponential-down weighting technique. Certain historical evaluation scores of the developers D1, D2 and D3 obtained for past software projects are extracted for computing the cumulative evaluation score using the Equation 4. Upon computing the cumulative evaluation score for each developer, the values obtained are as shown below:

Cumulative Evaluation Score (ESr) of developer
D1=264.56

Cumulative Evaluation Score (ESr) of developer
D2=277.47

Cumulative Evaluation Score (ESr) of developer
D3=224.35

Further, the performance evaluating system 107 ranks the developers in a descending order as (D2, D1 and D3). Furthermore, the performance evaluating system 107 analyzes the cumulative evaluation score and generates charts, graphs and the like to evaluate the performance of the developers based on the factors such as progress over time, strengths of the developer, weaknesses of the developer, areas for improvement and the like. Further, the performance evaluating system 107 allocates the appraisal rewards to each developer based on clustering of the developers having equivalent performance within the team or a certain domain. Consider other developers D4, D5, D6, D7 and D8 having the cumulative evaluation score 210, 200. 5, 230, 280 and 275 respectively. Therefore, the developers whose cumulative evaluation score is within the range of 200-230 may be considered to be having equivalent performance. Further, the developers whose cumulative evaluation score is within the range of 231-260 may be considered to be having equivalent performance. Furthermore, the developers whose cumulative evaluation score is within the range of 261-280 may be considered to be having equivalent performance. Therefore, as per the above mentioned range of cumulative evaluation scores, the developers are clustered as shown below:

Cluster 1={D1,D2,D7 and D8}

Cluster 2={D3,D4,D5 and D6}

Further, consider that the total reward fund is 5000 USD and the predefined criteria of the organization includes that reward fund for each developer of Cluster 2 should be 10% less than the reward fund of each developer of Cluster 1. Therefore, each developer in Cluster 1 would be provided "A" amount and each developer in Cluster 2 would be provided (A-D) amount. D may be an amount that is 10% less than the amount given to each developer of Cluster 1.

Figure 3:
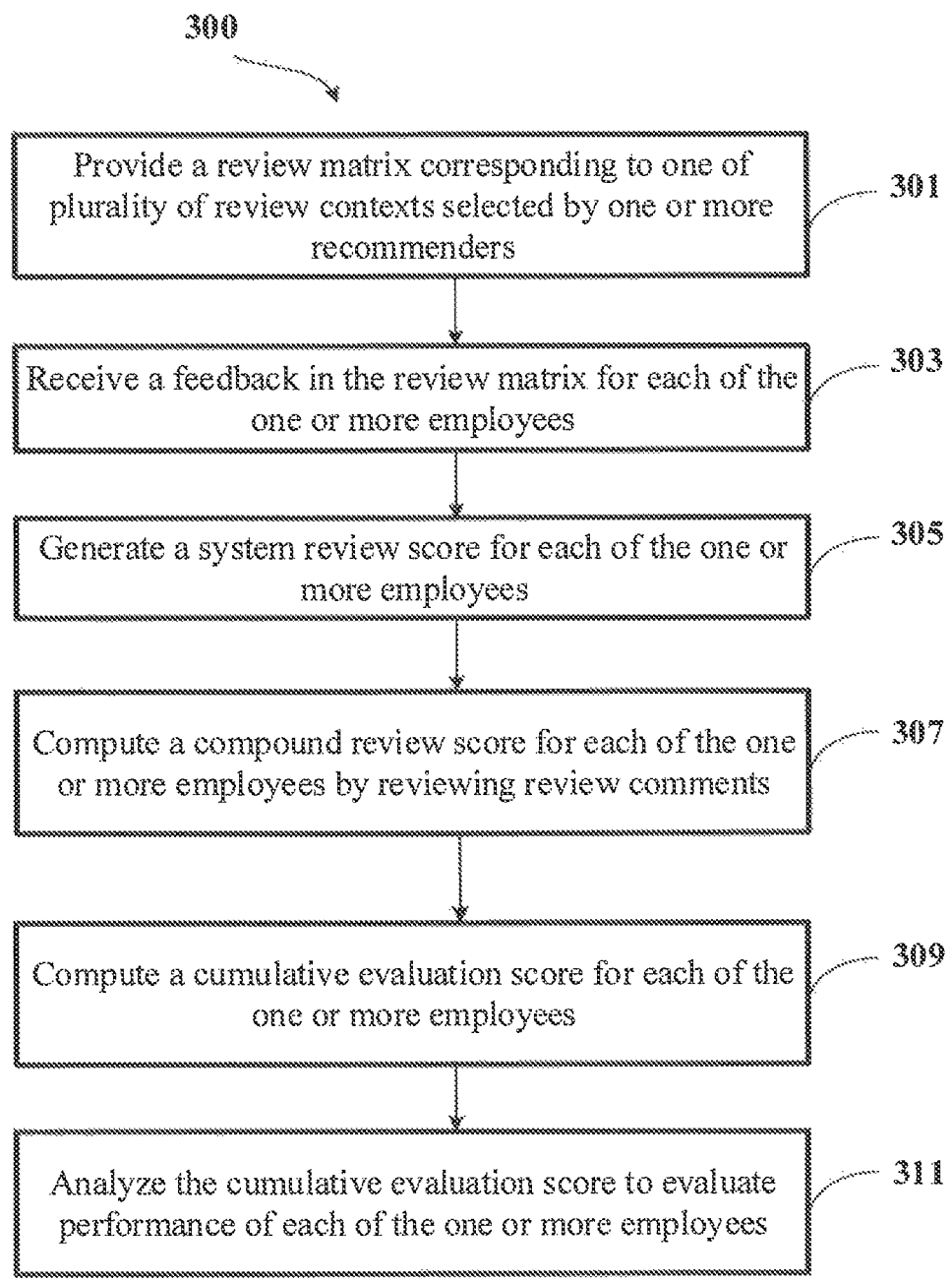
FIG. 3 shows a flowchart illustrating a method of evaluating performance of one or more employees of an organization in accordance with some embodiments of the present disclosure.

FIG. 3 shows a flowchart illustrating a method of evaluating performance of one or more employees of an organization in accordance with some embodiments of the present disclosure.

As illustrated in FIG. 3, the method 300 includes one or more blocks illustrating a method of evaluating performance of one or more employees 101 of an organization. The method 300 may be described in the general context of computer executable instructions. Generally, computer executable instructions can include routines, programs, objects, components, data structures, procedures, modules, and functions, which perform functions or implement abstract data types.

The order in which the method 300 is described is not intended to be construed as a limitation, and any number of the described method blocks can be combined in any order to implement the method 300. Additionally, individual blocks may be deleted from the methods without departing from the spirit and scope of the subject matter described herein. Furthermore, the method 300 can be implemented in any suitable hardware, software, firmware, or combination thereof.

At block 301, the method 300 may include providing, by a processor 109 of the performance evaluating system 107, a review matrix corresponding to one of plurality of review contexts selected by one or more recommenders 103 on corresponding end user devices 105. The review matrix is a template that includes review parameters associated with the plurality of review contexts, corresponding scoring boxes for individual scores related to the review parameters and a text box for review comments. In some embodiments, the review context may be the functionalities of the one or more employees 101 in the organization.

At block 303, the method 300 may include receiving, by the processor 109, a feedback in the review matrix for each of the one or more employees 101 from the one or more recommenders 103. The feedback of the one or more recommenders 103 may include a recommender's review score and review comments. In some embodiments, the review comments are provided in English language.

At block 305, the method 300 may include, generating, by the processor 109, a system review score for each of the one or more employees 101 by analysing the review comments. In some embodiments, the processor 109 may use the Natural Language Processing technique to analyse the review comments received from the one or more recommenders 103.

At block 307, the method 300 may include, computing, by the processor 109, a compound review score for each of the one or more employees 101 for each of the plurality of review contexts using the recommender's review score and the system review score. In some embodiments, the processor 109 may compute a Square Error (SE) value between the recommender's review score and the system review score corresponding to the review context for each of the one or more recommenders 103. The processor 109 may compare the SE value obtained with a predefined SE threshold to identify a first weightage value corresponding to the recommender's review score and a second weightage value corresponding to the system review score. Thereafter, the processor 109 may correlate the recommender's review score with the first weightage value and the system review score with the second weightage value to generate a compound review score for each of the one or more employees 101 corresponding to the selected review context.

At block 309, the method 300 may include, computing, by the processor 109, a cumulative evaluation score for each of the one or more employees 101 using the compound review score generated for each of the plurality of review contexts, predefined organizational weights and historical evaluation score of each of the one or more employees 101. In some embodiments, the processor 109 may correlate the compound review score of each of the plurality of review contexts with corresponding predefined organizational weights to generate a current evaluation score for each of the one or more employees 101. Further, the processor 109 may correlate the current evaluation score of each of the one or more employees 101 with their respective historical evaluation scores to generate the cumulative evaluation score of each of the one or more employees 101.

At block 311, the method 300 may include, analysing, by the processor 109, the cumulative evaluation score of each of the one or more employees 101 to evaluate performance of each of the one or more employees 101. Further, the processor 109 may rank each of the one or more employees 101 based on their respective cumulative evaluation score. Based on the ranking and the analysis, the processor 109 may cluster the one or more employees 101 depicting equivalent performance and may automatically compute appraisal rewards to be allotted to each of the one or more employees 101 present in each cluster based on a predefined criteria.

Figure 4:
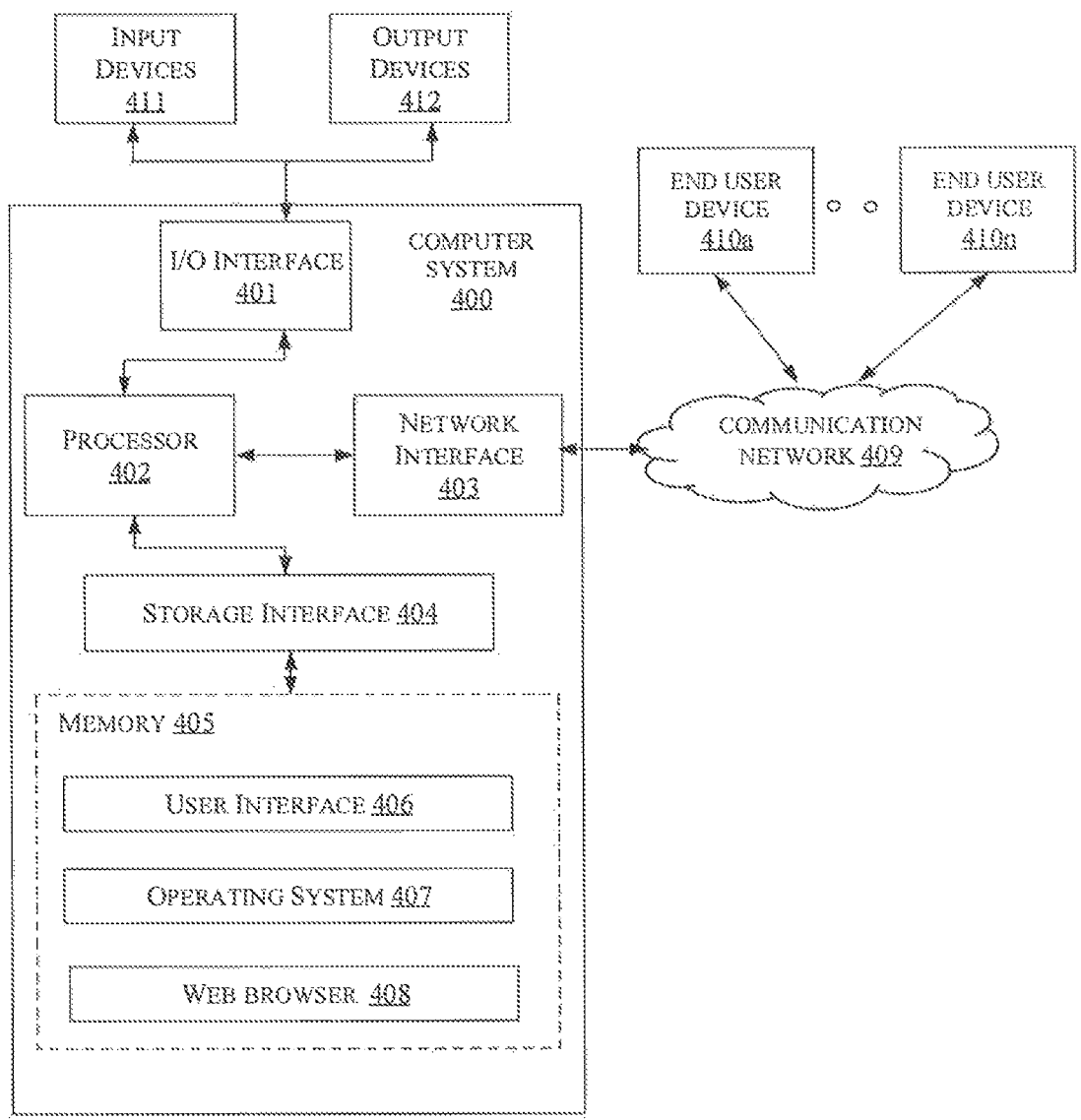
FIG. 4 is a block diagram of an exemplary computer system for implementing embodiments consistent with the present disclosure.

FIG. 4 is a block diagram of an exemplary computer system for implementing embodiments consistent with the present disclosure.

In an embodiment, FIG. 4 illustrates a block diagram of an exemplary computer system 400 for implementing embodiments consistent with the present invention. In an embodiment, the computer system 400 can be performance evaluating system 107 that is used for evaluating performance of one or more employees 101 of an organization. The computer system 400 may include a central processing unit ("CPU" or "processor") 402. The processor 402 may include at least one data processor for executing program components for executing user or system-generated business processes. A user may include a person, a person using a device such as such as those included in this invention, or such a device itself. The processor 402 may include specialized processing units such as integrated system (bus) controllers, memory management control units, floating point units, graphics processing units, digital signal processing units, etc.

The processor 402 may be disposed in communication with one or more input/output (I/O) devices (411 and 412) via I/O interface 401. The I/O interface 401 may employ communication protocols/methods such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE), WiMax, or the like), etc.

Using the I/O interface 401, computer system 400 may communicate with one or more I/O devices (411 and 412).

In some embodiments, the processor 402 may be disposed in communication with a communication network 409 via a network interface 403. The network interface 403 may communicate with the communication network 409. The network interface 403 may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, etc. Using the network interface 403 and the communication network 409, the computer system 400 may communicate with end user devices 410 of one or more recommenders 103. The communication network 409 can be implemented as one of the different types of networks, such as intranet or Local Area Network (LAN) and such within the organization. The communication network 409 may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the communication network 409 may include a variety of network devices, including routers, bridges, servers, computing devices, storage devices, etc. The image repository 410 may include, but not limited to, a laptop, a mobile, a tablet and a desktop. In some embodiments, the processor 402 may be disposed in communication with a memory 405 (e.g., RAM, ROM, etc. not shown in FIG. 4) via a storage interface 404. The storage interface 404 may connect to memory 405 including, without limitation, memory drives, removable disc drives, etc., employing connection protocols such as Serial Advanced Technology Attachment (SATA), Integrated Drive Electronics (IDE), IEEE-1394. Universal Serial Bus (USB), fibre channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 405 may store a collection of program or database components, including, without limitation, a user interface 406, an operating system 407, a web browser 408 etc. In some embodiments, the computer system 400 may store user/application data, such as the data, variables, records, etc. as described in this invention. Such databases may be implemented as fault-tolerant, relational, scalable, secure databases such as Oracle or Sybase.

The operating system 407 may facilitate resource management and operation of the computer system 400. Examples of operating systems include, without limitation, Apple Macintosh OS X, UNIX, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), International Business Machines (IBM) OS/2, Microsoft Windows (XP, Vista/7/8, etc.), Apple iOS, Google Android, Blackberry Operating System (OS), or the like. The User interface 406 may facilitate display, execution, interaction, manipulation, or operation of program components through textual or graphical facilities. For example, user interfaces may provide computer interaction interface elements on a display system operatively connected to the computer system 400, such as cursors, icons, check boxes, menus, scrollers, windows, widgets, etc. Graphical User Interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 400 may implement the web browser 408 stored program components. The web browser 408 may be a hypertext viewing application, such as Microsoft Internet Explorer, Google Chrome, Mozilla Firefox, Apple Safari, etc. Secure web browsing may be provided using Secure Hypertext Transport Protocol (HTTPS) secure sockets layer (SSL), Transport Layer Security (TLS), etc. Web browsers may utilize facilities such as AJAX, DHTML, Adobe Flash, JavaScript, Java, Application Programming Interfaces (APIs), etc. In some embodiments, the computer system 400 may implement a mail server stored program component. The mail server may be an Internet mail server such as Microsoft Exchange, or the like. The mail server may utilize facilities such as Active Server Pages (ASP), ActiveX, American National Standards Institute (ANSI) C++/C #, Microsoft .NET, CGI scripts, Java, JavaScript, PERL, PHP, Python, WebObjects, etc. The mail server may utilize communication protocols such as Internet Message Access Protocol (IMAP), Messaging Application Programming Interface (MAPI), Microsoft Exchange, Post Office Protocol (POP), Simple Mail Transfer Protocol (SMTP), or the like. In some embodiments, the computer system 400 may implement a mail client stored program component. The mail client may be a mail viewing application, such as Apple Mail, Microsoft Entourage, Microsoft Outlook, Mozilla Thunderbird, etc.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, non-volatile memory, hard drives, Compact Disc (CD) ROMs, Digital Video Disc (DVDs), flash drives, disks, and any other known physical storage media.

Advantages of the Embodiment of the Present Disclosure are Illustrated Herein.

In an embodiment, the present disclosure provides a method and a system for evaluating performance of one or more employees of an organization.

The present disclosure provides a feature wherein employees of an organization are evaluated holistically based on all the functionalities that the employee of a certain role can perform.

The present disclosure provides a feature wherein the employee and the recommender provide feedback for each other, thereby ensuring that both the parties effectively communicate and close on the feedback process in a timely manner.

The present disclosure provides a feature wherein the performance of the employee in the past projects is given certain weightage while evaluating the performance of the employee in the current project.

The present disclosure provides a feature wherein the performance evaluation of the employee does not completely depend only on the review score provided by the recommender. The system may generate a system review score by analysing the review comments provided by the recommender. Based on the error between the recommender's review score and the system review score, certain weightage is assigned to both the scores that helps in computing the final score of the employee. Since the review comments are also considered, some words such as "good" "improve" "less time taken" may help in evaluating the performance better.

The present disclosure is an unbiased system for evaluating the employees of the organization.

The present disclosure provides a feature wherein the employees having equivalent performance are clustered and automatically computed fraction of appraisal rewards may be allocated equally to each employee within the cluster.

The present disclosure helps in identifying areas of strength and improvements for the employees based on the evaluation.

The present disclosure provides an application for evaluating the performance of employees which could be integrated in many customer databases once and hence the time to deploy and develop would be quick.

A description of an embodiment with several components in communication with each other does not imply that all such components are required. On the contrary a variety of optional components are described to illustrate the wide variety of possible embodiments of the invention.

When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The specification has described a method and a system for evaluating performance of one or more employees of an organization. The illustrated steps are set out to explain the exemplary embodiments shown, and it should be anticipated that on-going technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open-ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

REFERRAL NUMERALS

| Reference Number | Description |
|---|---|
| 100 | Architecture |
| 101 | One or more employees |
| 103 | One or more recommenders |
| 105 | End user devices |
| 107 | Performance evaluating system |
| 109 | Processor |
| 111 | I/O interface |
| 113 | Memory |
| 203 | Data |
| 205 | Modules |
| 207 | Task data |
| 209 | Review context data |
| 211 | Review matrix data |
| 213 | Score data |
| 215 | Historical data |
| 217 | Analysis data |
| 219 | Reward data |
| 221 | Cluster data |
| 225 | Other data |
| 231 | Task creating module |
| 233 | Feedback obtaining and analysing module |
| 235 | Score generating module |
| 237 | Performance evaluating module |
| 239 | Rewards allocating module |
| 243 | Other modules |

What is claimed is:

1. A computer-implemented method of evaluating performance of one or more employees of an organization, the method comprising:
providing, by a performance evaluating system, a review matrix corresponding to one of plurality of review contexts assigned to one or more recommenders on corresponding end user devices;
receiving, by the performance evaluating system via a communication network, a feedback in the review matrix for each of the one or more employees from the one or more recommenders, wherein the feedback comprises a recommender's review score and review comments;
assigning, by the performance evaluating system, a unique ID for the recommender's review score and review comments in the feedback received for each of the one or more employees;
generating, by the performance evaluating system, a system review score for each of the one or more employees by analysing the review comments using a Natural Language Processing (NLP) technique;
computing, by the performance evaluating system, a compound review score for each of the one or more employees for each of the plurality of review contexts using the recommender's review score, the system review score, and the unique ID, wherein computing the compound review score comprises:
computing, by the performance evaluating system, a Square Error (SE) value between the recommender's review score and the system review score corresponding to the review context for each of the one or more recommenders;
comparing, by the performance evaluating system, the SE value with a predefined SE threshold stored in a memory to identify a first weightage value corresponding to the recommender's review score and a second weightage value corresponding to the system review score; and
correlating, by the performance evaluating system, the recommender's review score with the first weightage value and the system review score with the second weightage value to generate the compound review score;
computing, by the performance evaluating system, a cumulative evaluation score for each of the one or more employees using at least one of linear weighting technique or an exponential-down weighting technique on the compound review score generated for each of the plurality of review contexts, predefined organizational weights and historical evaluation score of each of the one or more employees that are stored in the memory; and
analysing, by the performance evaluating system, the cumulative evaluation score of each of the one or more employees to evaluate performance of each of the one or more employees, wherein the evaluated performance of each of the one or more employees is used for project management and task assignment in the organization.

2. The method as claimed in claim 1 further comprises ranking, by the performance evaluation system, each of the one or more employees based on their respective cumulative evaluation score.

3. The method as claimed in claim 1 further comprises clustering, by the performance evaluation system, the one or more employees depicting equivalent performance based on the ranking and the analysis.

4. The method as claimed in claim 1 further comprises computing, by the performance evaluation system, appraisal rewards to be allotted to each of the one or more employees present in each cluster based on a predefined criteria.

5. The method as claimed in claim 1, wherein computing the cumulative evaluation score comprises:
correlating, by the performance evaluating system, the compound review score of each of the plurality of review contexts with the corresponding predefined organizational weights to generate a current evaluation score for each of the one or more employees; and
correlating, by the performance evaluating system, the current evaluation score of each of the one or more employees with their respective historical evaluation scores to generate the cumulative evaluation score, wherein (i) the exponential-down weighting technique is used for computing the cumulative evaluation score when only a fraction of the historical evaluation scores need to be considered and (ii) the linear weighting technique is used for computing the cumulative evaluation score when 100% of the historical evaluation scores need to be considered.

6. The method as claimed in claim 1, wherein the recommender's review score is generated by averaging individual scores provided for each review parameter in the review matrix by each of the one or more recommenders.

7. A performance evaluating system for evaluating performance of one or more employees of an organization, the performance evaluating system comprising:
a processor; and
a memory communicatively coupled to the processor, wherein the memory stores the processor-executable instructions, which, on execution, causes the processor to:
provide a review matrix corresponding to one of plurality of review contexts assigned to one or more recommenders on corresponding end user devices;
receive, via a communication network, a feedback in the review matrix for each of the one or more employees from the one or more recommenders, wherein the feedback comprises a recommender's review score and review comments;

assign a unique ID for the recommender's review score and review comments in the feedback received for each of the one or more employees;

generate a system review score for each of the one or more employees by analysing the review comments using a Natural Language Processing (NLP) technique;

compute a compound review score for each of the one or more employees for each of the plurality of review contexts using the recommender's review score, the system review score, and the unique ID, wherein, to compute the compound review score, the instructions cause the processor to:
  compute a Square Error (SE) value between the recommender's review score and the system review score corresponding to the review context for each of the one or more recommenders;
  compare the SE value with a predefined SE threshold stored in a memory to identify a first weightage value corresponding to the recommender's review score and a second weightage value corresponding to the system review score; and
  correlate the recommender's review score with the first weightage value and the system review score with the second weightage value to generate the compound review score;

compute a cumulative evaluation score for each of the one or more employees using at least one of linear weighting technique or an exponential-down weighting technique on the compound review score generated for each of the plurality of review contexts, predefined organizational weights and historical evaluation score of each of the one or more employees that are stored in the memory; and analyse the cumulative evaluation score of each of the one or more employees to evaluate performance of each of the one or more employees, wherein the evaluated performance of each of the one or more employees is used for project management and task assignment in the organization.

8. The performance evaluating system as claimed in claim 7, wherein the processor is further configured to rank each of the one or more employees based on their respective cumulative evaluation score.

9. The performance evaluating system as claimed in claim 7, wherein the processor is further configured to cluster the one or more employees depicting equivalent performance based on the ranking and the analysis.

10. The performance evaluating system as claimed in claim 7, wherein the processor is further configured to compute appraisal rewards to be allotted to each of the one or more employees present in each cluster based on a predefined criteria.

11. The performance evaluating system as claimed in claim 7, wherein, to compute the cumulative evaluation score, the instructions cause the processor to:
  correlate the compound review score of each of the plurality of review contexts with the corresponding predefined organizational weights to generate a current evaluation score for each of the one or more employees; and
  correlate the current evaluation score of each of the one or more employees with their respective historical evaluation scores to generate the cumulative evaluation score, wherein (i) the exponential-down weighting technique is used for computing the cumulative evaluation score when only a fraction of the historical evaluation scores need to be considered and (ii) the linear weighting technique is used for computing the cumulative evaluation score when 100% of the historical evaluation scores need to be considered.

12. The performance evaluating system as claimed in claim 7, wherein the processor generates the recommender's review score by averaging individual scores provided for each review parameter in the review matrix by each of the one or more recommenders.

13. A non-transitory computer readable medium including instructions stored thereon that when processed by at least one processor causes a performance evaluating system to perform operations comprising:
  providing a review matrix corresponding to one of plurality of review contexts assigned to one or more recommenders on corresponding end user devices;
  receiving, via a communication network, a feedback in the review matrix for each of the one or more employees from the one or more recommenders, wherein the feedback comprises a recommender's review score and review comments;
  assigning a unique ID for the recommender's review score and review comments in the feedback received for each of the one or more employees;
  generating a system review score for each of the one or more employees by analysing the review comments using a Natural Language Processing (NLP) technique;
  computing a compound review score for each of the one or more employees for each of the plurality of review contexts using the recommender's review score, the system review score, and the unique ID, wherein computing the compound review score comprises:
    computing, by the performance evaluating system, a Square Error (SE) value between the recommender's review score and the system review score corresponding to the review context for each of the one or more recommenders;
    comparing, by the performance evaluating system, the SE value with a predefined SE threshold stored in a memory to identify a first weightage value corresponding to the recommender's review score and a second weightage value corresponding to the system review score; and
    correlating, by the performance evaluating system, the recommender's review score with the first weightage value and the system review score with the second weightage value to generate the compound review score;
  computing a cumulative evaluation score for each of the one or more employees using at least one of linear weighting technique or an exponential-down weighting technique on the compound review score generated for each of the plurality of review contexts, predefined organizational weights and historical evaluation score of each of the one or more employees that are stored in the memory; and
  analysing the cumulative evaluation score of each of the one or more employees to evaluate performance of each of the one or more employees.

14. The medium as claimed in claim 13, wherein the instructions cause the processor to rank each of the one or more employees based on their respective cumulative evaluation score.

15. The medium as claimed in claim 13, wherein the instructions cause the processor to cluster the one or more employees depicting equivalent performance based on the ranking and the analysis.

16. The medium as claimed in claim 13 wherein the instructions cause the processor to compute appraisal rewards to be allotted to each of the one or more employees present in each cluster based on a predefined criteria.

* * * * *